UNITED STATES PATENT OFFICE.

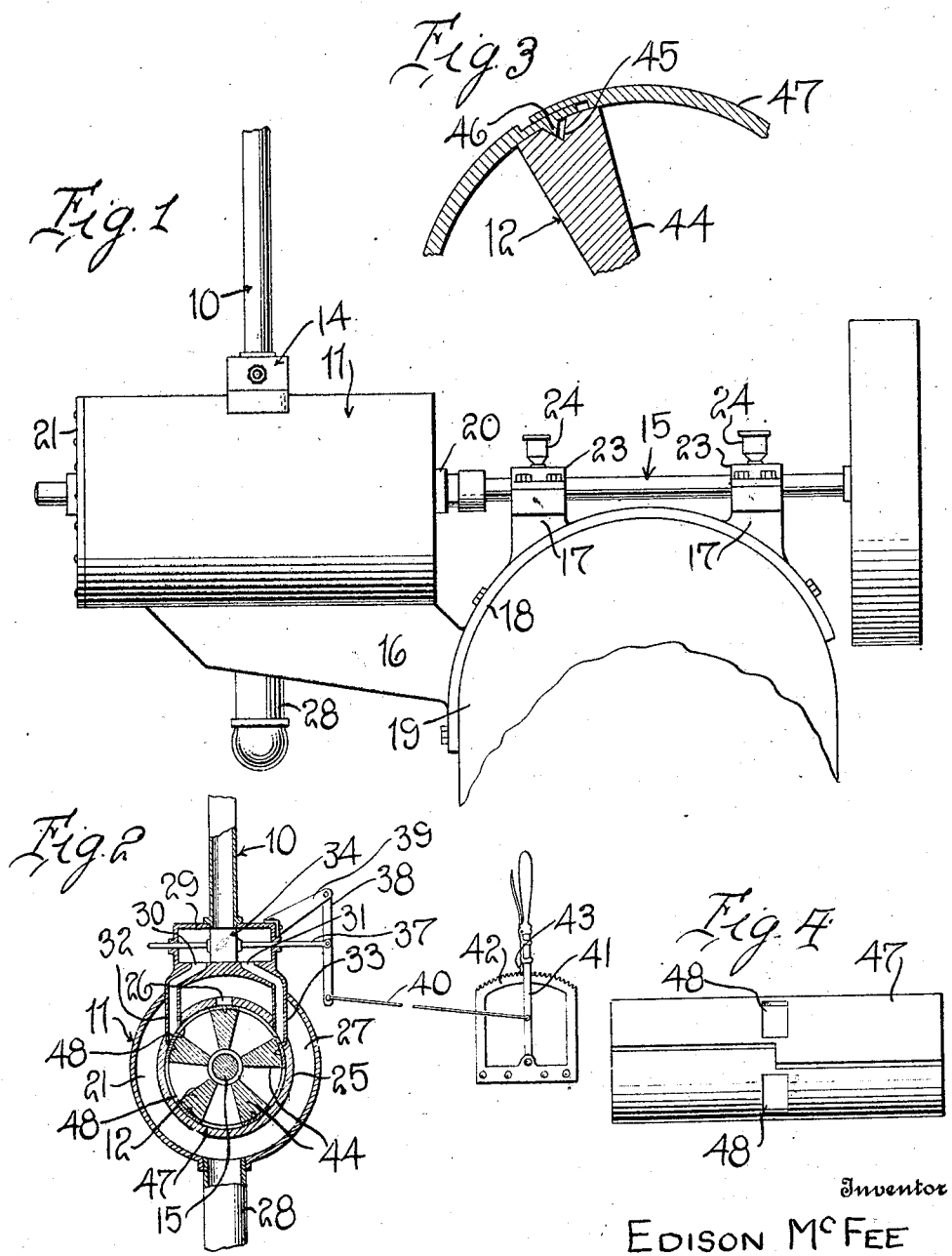

EDISON McFEE, OF HAMILTON, MISSOURI.

STEAM-ENGINE.

1,155,939.  Specification of Letters Patent.  Patented Oct. 5, 1915.

Application filed May 10, 1915. Serial No. 27,162.

*To all whom it may concern:*

Be it known that I, EDISON MCFEE, a citizen of the United States, residing at Hamilton, in the county of Caldwell and State of Missouri, have invented certain new and useful Improvements in Steam-Engines, of which the following is a specification, reference being had to the accompanying drawings.

My present invention relates to new and useful improvements in steam engines and has particular reference to those of the rotary type.

The principal object of the invention is to provide a rotary steam engine which is relatively simple in construction and may, therefore, be cheaply manufactured and one in which the rotor is so designed that a maximum utilization of the expansive and impinging forces of the steam will be obtained during the use of the engine.

A further object of the invention is to provide a novel form of rotor and piston ring, the piston ring being designed to allow for and compensate for expansion in the rotor.

The above, and other incidental objects of a similar nature, which will be hereinafter more specifically treated are accomplished by such means as are illustrated in the accompanying drawings, described in the following specification, and then more particularly pointed out in the claims which are appended hereto and form part of this application.

With reference to the drawings, wherein there has been illustrated the preferred embodiment of this invention, as it is reduced to practice, and throughout the several views of which similar reference numerals designate corresponding parts, Figure 1 is an end view of the engine, disclosing the parts thereof in operative, assembled relation; Fig. 2 is a detail section taken transversely through the steam engine; Fig. 3 is a detail enlarged section showing the piston ring applied to the piston or rotor vane; Fig. 4 is a face view of the piston ring.

As embodied in the accompanying drawings and as best disclosed as an operative entirety in Fig. 2 thereof, my engine includes a steam pipe 10 which leads from a boiler or other suitable steam source, a rotor cylinder 11, a rotor 12 which is journaled therein, a throttle valve 14 which controls the amount of steam admitted to the rotor, and the rotor shaft 15 from which the power is taken from the engine.

The boiler to which the pipe 10 is connected may be of any conventional type and need not be here further described, since it constitutes no portion of the invention. The engine bed, indicated at 16, and the rotor or driven shaft bearings 17 are formed as an integral casting with a saddle 18 which is mounted upon a suitable support indicated at 19.

The rotor cylinder is provided at one end with an integral bearing 20, in which the driven shaft is journaled and through which it projects, and is provided at its other end with a removable head plate 21 which is secured by bolts or equivalent fastening devices. The main shaft bearings are provided with cap plates 23 and oil cups indicated at 24 so that efficient lubrication of the main shaft will be obtained at all times.

Mounted within the cylinder is a concentrically disposed rotor casing 25 which is of cylindrical form and is provided at its upper portions with a longitudinally extending slot or opening 26, through which the steam exhausts from the rotor, into the annular space 27, included between the rotor casing and the cylinder. The steam escaping into this space 27 is exhausted through the pipe 28, which leads into the cylinder at the lower side thereof, as best disclosed in Fig. 2. Upon the upper side of the cylinder is mounted the steam throttle casing 29, the bottom wall of which is provided with two openings 30 and 31 through which the steam may pass, into the pipes 32 and 33. The terminals of these pipes are passed into the cylinder and across the space 27 and lead through the rotor casing at two points thereof, as shown in Fig. 2. The valve body of the throttle, indicated at 34, is slidably mounted and is provided with a valve stem 37 which is projected through the end wall of the throttle casing for pivotal connection with a link 38, the upper end of which is pivoted on a bracket arm 39, and the lower end of which is freely connected by a rod 40 to a throttle lever 41.

This lever 41 is pivoted upon a sector frame 42 and is provided with a pawl 43, by means of which the lever may be held in adjusted position. It will be seen, particularly upon reference to Fig. 2, that the throttle lever may be manipulated to not only control the path followed by the steam from the pipe 10 into the rotor casing, but that it may also be manipulated to control the amount of steam passing through the pipes 32 or 33 of the casing 29.

The rotor consists essentially in a plurality of radially extending, circumferentially spaced vanes or wings 44, which extend longitudinally on the rotor shaft and are of uniform width and length. The outer end faces of the rotor vanes are provided with longitudinally extending, substantially V-shaped grooves 45, wherein are seated the transversely extending ribs 46 formed on the inner face of the cylindrical piston ring 47. The piston ring 47 is formed in the nature of a sheet metal shell of cylindrical form, the meeting edges of which are scalloped and overlapped, as shown in detail in Figs. 3 and 4. The two elements of the scarf joint are adapted to slide one over the other to allow for expansion and contraction of the piston ring and, for this reason, the grooves 45 are made a greater depth and of a greater angle than the ribs 46, so that the ribs may move within the grooves when the piston or rotary ring is expanding or contracting.

Extending through the piston ring, are a plurality of circumferentially spaced slots or openings arranged to radially aline with the segmental chambers between the rotor vanes so that steam may enter these chambers or exhaust therefrom through the opening of the rotor casing.

From the foregoing description, the manner in which the engine is adapted to operate will now be apparent. It will be seen that the throttle may be initially adjusted to admit steam through the pipe 32. The steam passing through the pipe 32 will pass into one of the spaces between the vanes of the rotor and will expand, causing the rotation of the rotor. As each expansion chamber between the vanes of the rotor comes into alinement with the opening 26 of the rotor casing, the steam will exhaust into the annular chamber 27 between the rotor casing and cylinder and then escape from this chamber into the exhaust pipe 28.

It will be readily observed that if it is desired to reverse the direction of rotation of the rotor, this may be accomplished by adjusting the throttle lever to allow the steam to enter the rotor casing through the pipe 33, instead of through the pipe 32.

I now desire to direct particular attention to the construction of the piston ring and holding ribs thereof. As was previously explained, the holding ribs are seated in grooves which are of such cross-sectional area, as to permit the ribs to move transversely with respect to the base thereby making it possible for the piston ring to expand or contract in accordance with changes in temperature in the cylinder. The scarf joint at the adjoining edges of the piston ring is, of course, an essential complement of the ribs and grooves, since, were it not for this scarf joint, it would be impossible for the piston ring to contract or expand in the efficient manner desired.

In reduction to practice, it has been found that the form of this invention illustrated in the drawings and referred to in the above description as the preferred embodiment is the most efficient and practical; yet, realizing that the conditions concurrent with the adoption of this device will necessarily vary, it is desirable to emphasize the fact that various minor changes in the details of construction, proportion and arrangement of parts may be resorted to, when required, without sacrificing any of the advantages of this invention, as defined by the appended claims.

What is claimed is:—

1. A rotary steam engine including a cylinder, a rotor casing disposed concentrically therein to provide an annular chamber between the rotor casing and the cylinder, an exhaust opening in the rotor casing, a rotor journaled in the rotor casing, said rotor including a plurality of radially extending vanes, and a piston ring incasing the rotor vanes, said ring being provided with a plurality of openings, there being one opening communicating with each of the segmental chambers defined between the vanes, a steam supply pipe leading through the cylinder across said annular chamber and into the rotor casing, and a throttle valve for controlling the admission of steam into the rotor casing.

2. A rotary steam engine including a cylinder, a rotor casing, a rotor journaled in the casing, said rotor including a plurality of spaced, radially extending vanes provided in their outer ends with longitudinally extending, substantially V-shaped grooves, and a piston ring incasing the vanes, said piston ring being provided with a scarf joint, whereby the ring may expand or contract in accordance with variations in temperature within the rotor casing, and a plurality of circumferentially spaced, substantially V-shaped ribs extending transversely across the inner face of the piston ring, said ribs being adapted to seat in the grooves of the vanes and being movable therein to allow for expansion or contraction of the piston ring.

3. A rotary steam engine including a cylinder, a rotor casing, and a rotor journaled in the casing, said rotor including a plurality of rotor vanes, provided in their outer ends with longitudinally extending grooves, and a piston ring incasing the vanes, said ring being expansible and having a plurality of circumferentially spaced, transversely extending ribs on its inner faces, said ribs being adapted to seat in the grooves of the vanes and being movable therein, to allow for expansion or contraction of the piston ring.

In testimony whereof I hereunto affix my signature in the presence of two witnesses.

EDISON McFEE.

Witnesses:
D. O. LOVE,
C. E. LIVICK.